Jan. 24, 1939. W. NAUMANN 2,144,739
REGISTERING MACHINE FOR DIFFERENT MONEY STANDARDS
Filed Aug. 18, 1934 5 Sheets-Sheet 1

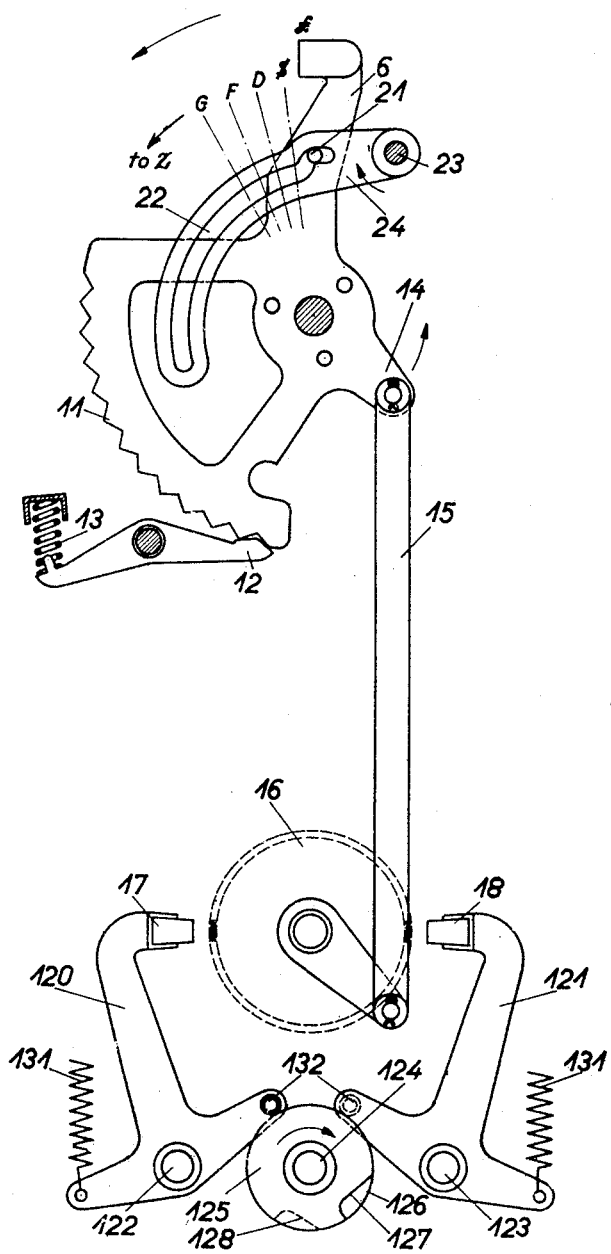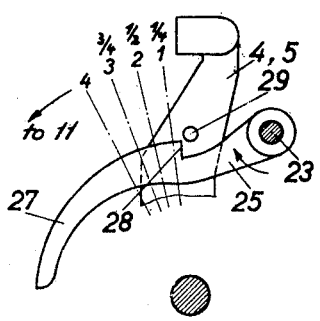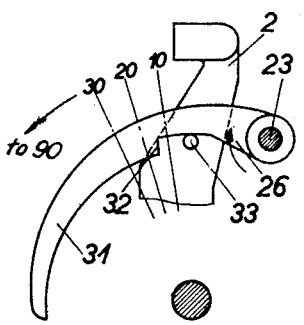

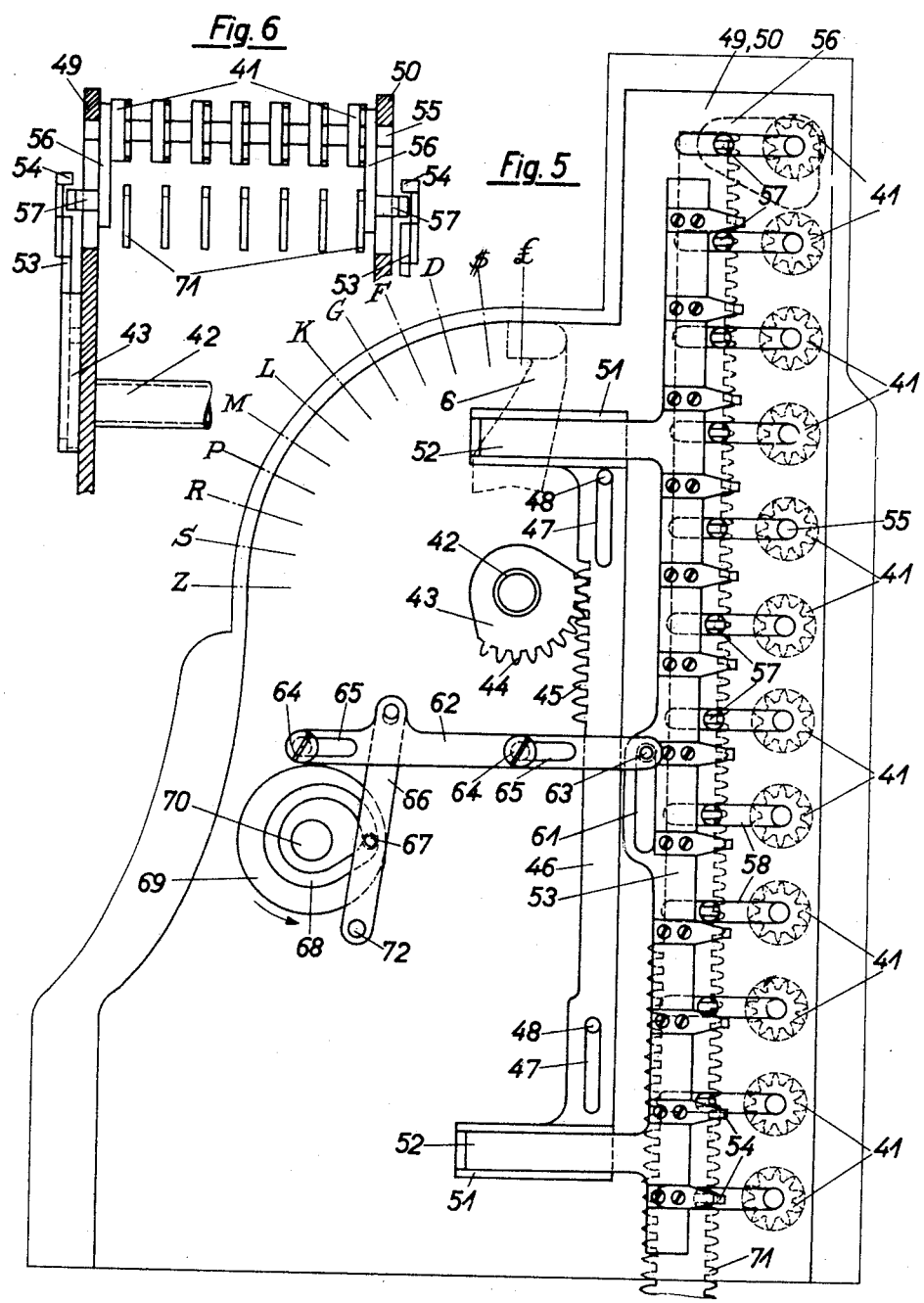

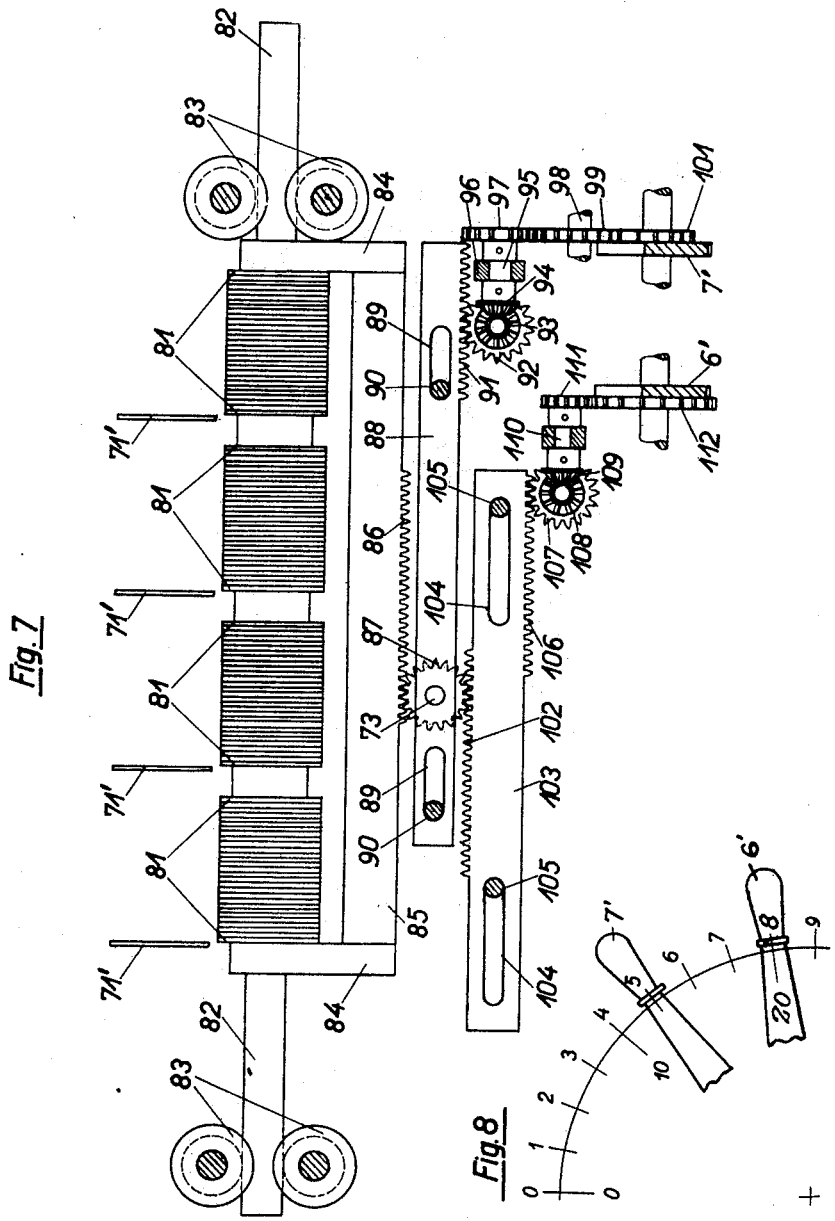

Patented Jan. 24, 1939

2,144,739

UNITED STATES PATENT OFFICE 2,144,739

REGISTERING MACHINE FOR DIFFERENT MONEY STANDARDS

Willy Naumann, Bielefeld, Germany, assignor to Anker-Werke, A. G. Bielefeld, Germany Application August 18, 1934, Serial No. 740,493
In Germany August 26, 1933

12 Claims. (Cl. 235—7)

The object of the instant invention is to provide a single registering machine adapted to a plurality of different money standards.

The registering machines of the prior art are each adapted to a single money standard. Printing arrangements are also known which print upon a voucher with indestructible print. The new combination disclosed herein consists in the provision of a machine which combines an apparatus for registering several money standards with a printing mechanism, which prints upon a voucher form inserted in the machine as well as upon a detail strip in indestructible impressions. The same serial numbers are printed upon the voucher and the control strip in a machine operation in known manner.

A registering machine is produced by the arrangement disclosed herein which is specially applicable in the checking divisions of banks in which checks of various money standards or systems are issued, the alteration of which must be prevented and the summation of which must be made according to the various money standards.

One particular inventive feature consists in the provision of a single setting field for the various standards. For this purpose, one or more special setting levers are provided which select the money standard which is to be registered. The amount setting mechanism of the machine is controlled by this one or more special setting levers in such a manner that only those amount setting means which may cooperate with the selected standard may be used, or at a particular setting of the machine, the amount setting means can be operated only to the extent which the selected money standard requires. The locking arrangement operates alternatively, so that a manipulation of the setting of the standard lever is prevented when the amount setting means is adjusted at such a point that it cannot cooperate with a particular money standard.

Figure 1:
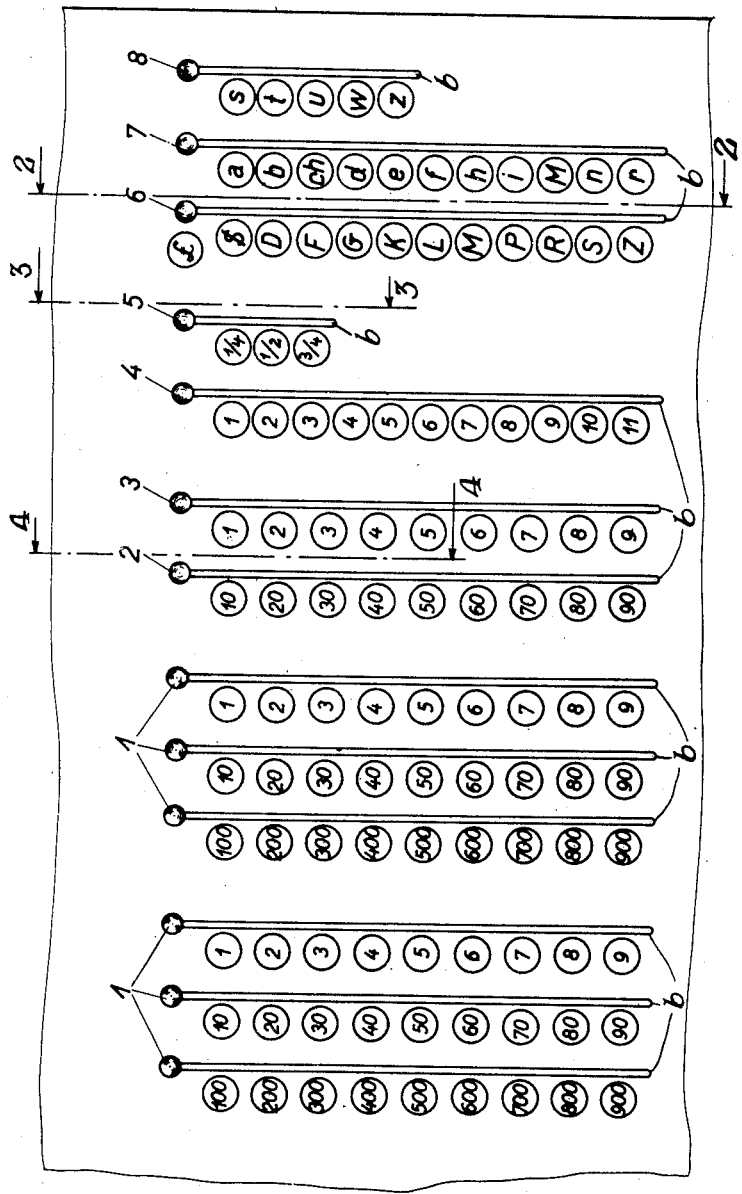
Figure 1A:
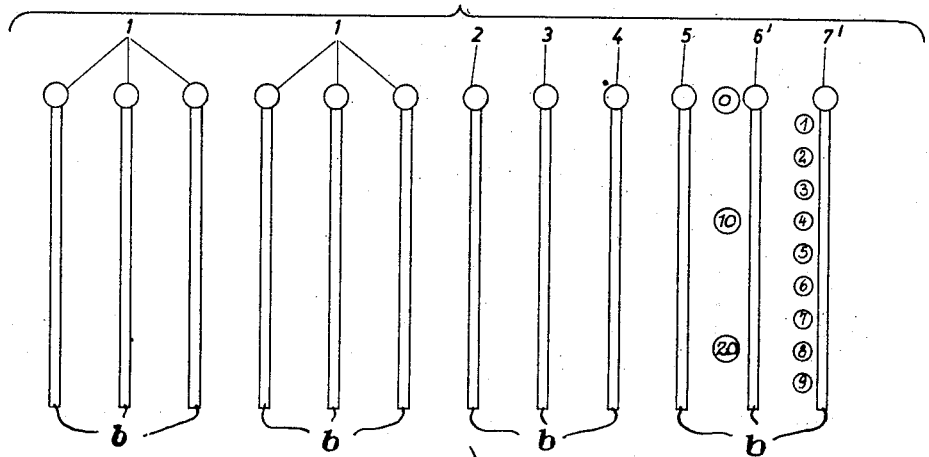

Other inventive features are embraced in the constructive embodiment of the invention, of which an example is described hereinafter and illustrated in the accompanying drawings, in which, Figure 1 shows a diagrammatic plan view of the setting board of the machine, Figure 1a is a similar view of the setting board of a second embodiment of the invention.

Figure 7A:
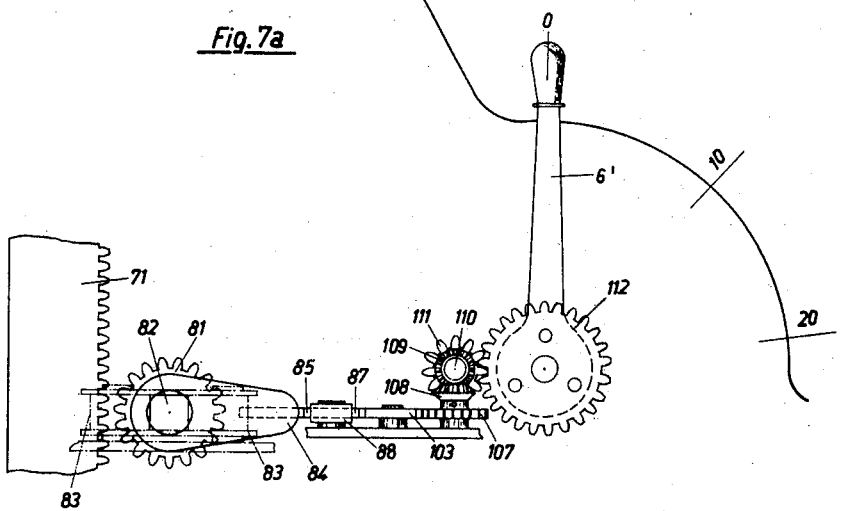

Figure 2 is a side view of an individual setting lever for the money standards, showing in addition the operative elements of the printing mechanism, Figures 3 and 4 are side views of details of the locking mechanism, Figure 5 shows the arrangement of the totalizers in the machine adapted to be selected for operation corresponding to the several positions of one of the standard selecting levers, Figure 6 is a horizontal sectional view above one of the totalizers in Figure 5, Figure 7 is a plan view, with parts in section, of a group of totalizers and their selecting mechanism for the second embodiment of the invention, shown in Fig. 1a, Figure 7a is a side view of the setting mechanism shown in Figure 7, and Figure 8 is a schematic illustration of the constructive arrangement shown in Figure 7.

The setting board shown in Fig. 1 illustrates an example of the inventive thought applied to an embodiment of a machine, which is adapted, on the one hand, for the English money standard, and on the other hand, for decimally subdivided money standards. Although the invention is shown associated with setting levers, it can be embodied as well in an arrangement of the machine utilizing any other known form of setting means, such as keys.

In Fig. 1, six setting levers 1 are provided which serve for setting the money units, such as pounds, marks, dollars, francs, guldens, etc., and two other setting levers 2 and 3 which are adapted to set the decimal sub-divisions of the lower units in two places as well as the shillings for the English standard. Another setting lever 4 may be set to one of eleven positions and effects a setting of the pence values for the English standard; another setting lever 5 effects the setting of the fractional values of pence, ¼, ½ and ¾.

In conjunction with these setting levers 1 to 5, which serve to set the amounts, are provided three setting levers 6, 7 and 8 which serve to select the desired money standard from time to time. These levers are designated hereinafter by the short term "standard levers".

Each of the levers 1 to 8 travels downward along a slot b, in the casing of the machine, beside which, at the various positions of adjustment of the respective levers, are numbers representing values, or symbols representing money standards. These numbers and symbols are enclosed in circles to differentiate them from reference characters.

In the event that the registering machine should operate only as a printing mechanism, the standard levers 6, 7 and 8 may be operated in such a manner that a letter combination is set up by the control of two of the levers to register the desired money standard. The setting of the levers controls type wheels, having types corresponding to the letter designations at the sides of the levers shown in Fig. 1, which are adjusted corresponding to the stops at which the levers are set. The combinations of letter designations indicated in Fig. 1 suffice for designating all the money standards which it may be desired to utilize. For example, upon a setting of lever 6 to the stop "R" and lever 7 to the stop "M", the German standard "RM", that is, reichsmark, is designated. The combination of the letters "Ffs" by a setting of levers 6, 7 and 8 designates the French standard of francs, the combination "Sfs" designates the Swiss franc standard and the combination "Sch", the Austrian shilling standard.

The controlling arrangement for the type wheels of standard levers 7 and 8 are duplicates of that shown in conjunction with standard lever 6 in Figure 2.

In the event that the registering arrangement should also accumulate the various registered amounts in the several standards, totalizers are arranged in known manner described below for the setting lever 6, which are selected by the setting of the standard lever upon the corresponding stop.

In Figs. 5 and 6 is illustrated an arrangement in which the setting of the standard lever 6 selects one of twelve totalizers for operation. Thus, if the lever 6 is set at the pounds setting, the lowermost totalizer in Fig. 5 is in position for engagement with the actuating racks 71. If the dollar ($) setting is selected, the totalizer next to the lowest is positioned for operation. If the reichsmark money standard is selected, and the lever 6 is set to R, the third totalizer from the top is positioned for engagement with the actuating racks. The settings of levers 7 and 8 in this arrangement do not affect the selection exercised by the setting of lever 6 and the former only adjust type wheels which cooperate with type wheels 16 set by lever 6 to complete the designation of the selected totalizer. Totalizers for standards which are not subdivided decimally, such as for the English system of units, incorporate tens-transfer mechanisms which are adapted to such standards. The mechanism disclosed in the U. S. Patent No. 1,279,688, September 24, 1918, discloses a tens-transfer mechanism adapted to the English money standard.

The selection of the totalizer by the controlling standard lever can be effected, for example, by a segregated arrangement of the totalizers, such as is shown in German Patent No. 209,737, which, furthermore, is illustrated generally in accompanying Figs. 5 and 6. As explained above, these totalizers are selected by the setting of lever 6 only.

The totalizers 41 are disposed vertically one above the other. A tube 42 is connected with the setting lever 6 and upon the former are fixed two toothed segments 43. The teeth 44 of each one of these segments engages in a toothed portion 45 of a carrier 46, which is vertically shiftable by means of longitudinal slots 47 therein upon pins 48. The pins 48 are fixed upon the lateral walls 49 and 50 of the machine. Each one of the carriers 46 has at its upper and lower ends, a slide bearing 51 in which the arms 52 of throw-in members 53 are horizontally shiftable. Each one of the throw-in members 53 carries engaging lugs 54 which are displaced from each other in such a manner that at the setting of the standard lever at the several stops, another pair of lugs on the same level arrives in position for operation.

The axles 55 of the totalizers 41 are disposed in frames 56 which carry pins 57, the pairs of pins 57 at opposite ends of each totalizer being spaced from the adjacent pairs above and below by a distance slightly greater than the distance between each superposed pair of engaging lugs 54. The totalizer axles 55 and the pins 57 are laterally shiftable in horizontal slots 58 of the side walls 49 and 50. A pin 63 of a draft rod 62 engages in a slot 61 of throw-in member 53 and the rod 62 is shiftably mounted upon two pins 64 by means of longitudinal slots 65. A lever 66 is pivoted upon a fixed bolt 72 and a roller 67 on the former engages a cam groove 68 of a disc 69 mounted upon a shaft 70. The shaft 70 rotates one revolution in a counterclockwise direction in every machine operation for imparting an actuating movement to the throw-in member by the parts described above. An actuating toothed bar 71 is controlled by each one of the amount setting levers 1—5, which, in known manner, receives an upward and downward movement by means of suitable actuating mechanisms corresponding to the set amounts, as is disclosed in the above-mentioned German Patent No. 209,737.

The described apparatus operates in the following manner:

Upon the setting of lever 6 in its normal position, the lowest totalizer 41 is set for operation, which, according to the arrangement indicated in Fig. 1, is allotted to the English standard. Upon the setting of standard lever 6 to any other stop, the toothed segments 43 and the carriers 46 and throw-in members 53 connected therewith, are raised to such an extent that the desired pair of engaging lugs or grippers 54 come into the path of the pins 57 of the totalizer corresponding to the setting of lever 6.

In the course of the machine operation, the throw-in member 53 is shifted to the left by means of draft rod 62 and the effective pair of engaging lugs 54 carry the counting wheels of the selected totalizer into operative engagement with the actuating bars 71.

In view of the fact that only a single totalizer must operate at one time for the purpose of accumulating the amounts according to the several money standards, all the totalizers may be brought into a single group and may be selected by a decimally sub-divided setting arrangement. A specific example of such a machine will be described presently, with reference to Fig. 7. In a machine of this kind, two setting levers are sufficient for selecting ninety-nine different positions, since one of the setting levers may control the tens setting of the totalizer number and the other setting lever the units of the totalizer number. The setting movement of both of these setting levers is combined by means of a differential drive such as is known in the setting of the printing carriage of bookkeeping machines, as disclosed in the patent to Breitling, No. 1,760,870, June 3, 1930. The setting movement is used for laterally shifting the totalizer groups with respect to their differential actuators, in the form of the invention shown in Fig. 7, but it may be used to shift coupling elements, such as 159 on shaft 161 of Fig. 15 of Bornkessel et al.

Patent No. 1,896,936. It is understood that the arrangement may be so designed that totalizers are provided for only the most important standards, while the less frequently used standards are registered only with an indestructible recording of the control strip. In such a case there would be a fewer number of totalizers than that shown in Figs. 5 and 7 for selective operation, although levers 6, 7 and 8 would effect a printing in all cases irrespective of whether or not a totalizer was selected.

In Fig. 7 is illustrated an embodiment of the invention, in which twenty-nine totalizers are embraced in a group. The gear wheels 81 of the totalizers are sub-divided among the orders so that the units, the tens, the hundreds, etc., adding wheels lie adjacent each other. The totalizer wheels 81 are rotatably arranged on a common axle 82. The axle 82 is shiftably arranged in a horizontal direction between pairs of rollers 83. A toothed bar 85 is rigidly connected with the axle 82 through arms 84, and a differential wheel 87 engages in the teeth 86 of bar 85. The differential wheel 87 is mounted by means of a bolt 73 upon a toothed bar 88, which bar is shiftably guided by means of longitudinal slots 89 therein upon two pins 90, and which, furthermore, has a toothed portion 91 meshing with a gear wheel 92. A bevel wheel 93 is rigidly connected with gear wheel 92 and the former cooperates with a second bevel gear 94 mounted upon a horizontal shaft 95 in bearing 96, which shaft carries at its other end a gear wheel 97. The gear wheel 97 meshes with the gear wheel 99 mounted upon shaft 98 and gear wheel 99 meshes with gear wheel 101, which is connected with the setting lever 7'.

The toothed portion 102 of a toothed bar 103 is in engagement with the differential wheel 87, which bar is shiftable upon pins 105 by means of longitudinal slots 104 therein. Another toothed portion 106 of the toothed bar 103 engages with a gear wheel 107 which is rigidly connected with a bevel wheel 108, which in turn meshes with a bevel wheel 109 disposed at right angles thereto. The axle 110 of the bevel wheel 109 carries at its other end a gear wheel 111 which engages with a toothed segment 112 connected with the setting lever 6'. The setting lever 6' corresponds to lever 6, shown in Figs. 1, 2 and 5 except that it has a possibility of three settings only instead of 12. In Fig. 8, the levers 6' and 7' are set for the selection of totalizer "25" for operation.

For a given movement of the rack bar 85 the rack bar 103 must move twice as far to the left as the rack bar 88 would have to move to the right; consequently, for one step of the lever 6' to move the rack bar 85 ten times as far as one step of lever 7', the rack bar 103 must be moved twenty times as far for each step of movement of lever 6' as rack bar 88 is moved for each step of movement of lever 7'. Since the movement of lever 6' from 0 to 10, as shown in Figs. 1a and 8 is four times as long as the movement of lever 7' from 0 to 1, the ratio of transmission from gear 112 to gear 107 must be five times as great as the ratio of transmission from gear 101 to gear 92. The setting movements of levers 6' and 7' combine by means of the differential gear 87 in such a manner that the totalizer axle 82 is set to that totalizer which corresponds to the number of the tens numeral set by lever 6' and to the units numeral set by lever 7', so that this totalizer is brought opposite to the actuators 71', which are moved according to the amount set as shown in the above-mentioned German Patent No. 209,737. In the case of laterally shiftable coupling elements according to the Bornkessel Patent No. 1,896,936, the axle 271 shown in Fig. 15 of this patent would be shifted corresponding to the axle 82 of Fig. 7 of this application by the combined movement of levers 6' and 7'.

In accordance with the invention, the following locking arrangements between the setting means are provided:

In Fig. 2 is illustrated the standard lever 6, which in known manner, is formed as a segment, having locking teeth 11 in which engages a holding pawl 12 under the force of a spring 13. Draft rod 15 is jointed to a rearwardly disposed projection 14 of the setting segment 6 which effects a setting of the type wheel 16. The printing type of the type wheel 16 are adapted to impress an indestructible imprint on the printing vouchers. Therefore, the type are provided with either points which penetrate the paper or they are formed of small inclined striations, which are formed in the manner of knives and which press into the paper. In order that impressions may be made upon a check inserted therein, as well as upon a control strip which is locked in the machine in indestructible type, two printing stations with printing platens 17 and 18 are provided, which are driven in the following manner:

The printing platens 17 and 18 are mounted upon multi-armed levers 120, 121 which are rotatably arranged upon pins 122 and 123, respectively. Two cam discs 125 and 126 are mounted upon shaft 124, which executes a full revolution in a clockwise direction at every machine operation, having recesses 127 and 128, respectively. The rollers 132 of the printing platen carriers 120 and 121 are pressed by means of springs 131 against the cams 125 and 126. Upon the rotation of these cam discs, the recesses 127 and 128 come into effect simultaneously and render free the rollers 132, so that the printing platens 17 and 18 are struck against the types 16 by the force of the springs 131.

A stop in the form of a pin 21 is arranged upon setting segment 6 which operates in a curved groove or recess 22 of a swinging member 24, which is fixed upon a shaft 23. A locking arm 25 (Fig. 3) is fixed upon shaft 23 adjacent each of setting levers 4 and 5, which locking arm has a circularly-shaped and upwardly bowed locking projection 27 as well as a locking shoulder 28. Setting levers 4 and 5 have stops in the form of pins 29 thereon, which cooperate with the locking members 27 and locking shoulders 28.

In the field of the setting lever 2, the shaft 23 has fixed thereon adjacent the setting lever a locking arm 26 having a downwardly directed locking projection 31 and a locking shoulder 32, which cooperate with the stop or pin 33 fixed upon the setting lever 2.

The mode of operation of the described locking elements is as follows:

The normal position of the setting lever 6 corresponds to the English pound standard or system. At this setting, the amount setting levers 1-5 are capable of being adjusted only so far as the requirements of the English system make it necessary. Since, as described above, the setting levers 2 and 3 serve for the setting of shilling values, and twenty shillings make one pound, the capacity of setting the setting lever 2 is so limited at the normal setting of the standard lever 6 by the locking shoulder 32 and locking arm 31, that the setting lever 2 can only be set to the 10 value; thereby, only 19 shillings may be registered. The setting levers 4 and 5 for the registration of pence values and the fractions of pence, are on the other hand, rendered free in the normal position of the standard lever 6, since the pins 29 can glide over the locking surfaces 27. As soon as one of the levers 4 and 5 are moved out of their normal position, the standard lever 6 can no longer be adjusted to another position, since a rotation of shaft 23 is prevented by the abutment of one or both of the locking surfaces 27 against pins 29.

On the other hand, when the reichsmark standard, for example, is selected by means of levers 6 and 7, the curved slot 22 of the swinging member 24 coacting with pin 21 on lever 6 rotates shaft 23 in a clockwise direction so far that the locking shoulder 28 of the locking members 25 comes to lie in front of the pins 29 of levers 4 and 5, and the locking shoulder 32 of the locking element 26 is removed from the path of pin 33 on the lever 2. At this setting, the setting levers 4 and 5 are locked, while the setting lever 2 is rendered free for the purpose of setting the desired tens of pfennigs. A resetting of the standard lever 6 to the English standard is not possible so long as the setting lever 2 is in a position below the tens, because the locking edge 31 prevents a return rotation of the shaft 23 by pin 33 abutting against it.

It is noted that the setting levers 1–4 may have a special setting for the zero type apart from a normal home position. Thereby zero elimination is attained in a simple manner by the mere retention of the levers in their home positions. A particularly simple and economical construction of the apparatus is attained thereby.

Having described my invention, what I claim is:

1. In a machine of the class described, setting means for adjusting the machine for the registration of different money standards, a control shaft, means whereby said control shaft is rocked by the adjustment of said setting means to a certain position, amount setting means, locking members connected with said shaft adjacent particular ones of said amount setting means used in different ways for different money standards, and locking elements on said particular amount setting means cooperating with said locking members for preventing a setting of said first-mentioned means at a predetermined setting of said particular amount setting means and for locking said particular amount setting means at a predetermined setting of said first-mentioned means.

2. In a machine of the class described, setting means for adjusting the machine for the registration of different money standards, a control shaft, a lever having a curved groove connected with said control shaft, a pin on said setting means engaging said groove for shifting said lever and rocking said control shaft by the adjustment of said setting means, amount setting means, and locking means adjusted by said control shaft for preventing the adjustment of said money standard setting means for a certain money standard at a predetermined setting of those of the amount setting means used in different ways for different money standards, and for preventing the adjustment of said last-named amount setting means at a predetermined position of said money standard setting means.

3. In a machine of the class described, setting means for adjusting the machine for the registration of different money standards, a control shaft, a lever having a curved groove connected with said control shaft, a pin on said setting means engaging said groove for shifting said lever and rocking said control shaft by the adjustment of said setting means, amount setting means, locking members connected with said shaft adjacent particular ones of said amount setting means, and locking elements on said particular amount setting means cooperating with said locking members for preventing a setting of said first-mentioned means at predetermined settings of said particular amount setting means and for locking said particular amount setting means at predetermined settings of said first-mentioned means.

4. In a machine of the class described, a plurality of totalizers respectively adapted for the cumulation of amounts in different money standards, setting means to select a totalizer for operation, amount setting means including elements common to all of said money standards and elements specific to certain of said money standards, and blocking means operable by said first setting means for limiting the manipulation of the elements of said amount setting means specific to certain money standards to conform to the particular money standard corresponding to the selected totalizer.

5. In a machine of the class described, a plurality of totalizers respectively adapted for the cumulation of amounts in different money standards, setting means to select a totalizer for operation, amount setting means including elements common to all of said money standards and elements specific to certain of said money standards, and blocking means interposed between said first setting means and said amount setting means specific to certain money standards preventing the setting of the former to a money standard incompatible with the setting of said amount setting means.

6. In a machine of the class described, a totalizer for cumulating amounts in English currency, a totalizer for cumulating amounts in a decimal currency, amount setting means for adjusting the tens values of the decimal currency and of the shillings of the English currency, setting means for selecting one of said totalizers for operation, and blocking means controlled by said last setting means for preventing operation of said amount setting means beyond its first step when said last setting means is set for English currency.

7. In a machine of the class described, a totalizer for cumulating amounts in English currency, a totalizer for cumulating amounts in a decimal currency, amount setting means for adjusting the tens values of the decimal currency and of the shillings of the English currency, setting means for selecting one of said totalizers for operation, and blocking means for preventing the setting of said last setting means to the English standard when said amount setting means is beyond its first step.

8. In a machine of the class described, setting means for adjusting the machine for cumulation of decimal currencies or English currency, an amount setting means for adjusting the tens values of the decimal currency and of the shillings of the English currency, a control shaft, means operated by said first setting means on the setting of the same to a decimal currency for rocking said shaft, an arm adjacent said amount setting means connected with said shaft and a stop on said amount setting means cooperable with said arm, said arm in its normal position having a locking shoulder in the path of said stop displaced from said stop only far enough to permit a unit setting of said amount setting means, said arm being raised by the rocking of said control shaft to remove said locking shoulder from the path of the stop to permit a setting of said amount setting means over its complete range.

9. In a machine of the class described, setting means for adjusting the machine for cumulation of decimal currencies or English currency, amount setting means for adjusting the tens values of the decimal currency and of the shillings of the English currency, a control shaft, means operated by said first setting means on the setting of the same to a decimal currency for rocking said shaft, an arm adjacent said amount setting means connected with said shaft and a stop on said amount setting means cooperable with said arm, said arm in its normal position having a locking shoulder in the path of said stop displaced from said stop only far enough to permit a unit setting of said amount setting means, said arm being raised by the rocking of said control shaft to remove said locking shoulder from the path of the stop to permit a setting on said amount setting means over its complete range, said arm having a locking edge cooperating with said stop at a setting of said amount setting means beyond the unit setting to block said control shaft against the backward rocking caused by the setting of said first setting means to the English currency.

10. In a machine of the class described, setting means for adjusting the machine for the registration of decimal currencies and English currency, amount setting means for adjusting the pence values for the English currency, a control shaft, means actuated by said first setting means upon the setting thereof to a decimal currency for rocking said shaft, an arm adjacent said amount setting means connected with said shaft, and a stop on said amount setting means cooperable with said arm, said arm having a locking shoulder adapted to be raised into the path of said stop by the rocking of said control shaft, to prevent operation of said amount setting means.

11. In a machine of the class described, setting means for adjusting the machine for the registration of decimal currencies and English currency, amount setting means for adjusting the pence values for the English currency, a control shaft, means actuated by said first setting means upon the setting thereof to a decimal currency for rocking said shaft, an arm adjacent said amount setting means connected with said shaft, and a stop on said amount setting means cooperable with said arm, said arm having a locking shoulder adapted to be raised into the path of said stop by the rocking of said control shaft, to prevent operation of said amount setting means, and a locking edge cooperating with said stop in the operative position of said amount setting means to prevent the setting of said first setting means to a decimal currency.

12. A machine as described in claim 4, wherein said first setting means are arranged in a plurality of orders, and means for imparting to said selecting means a motion corresponding to the combined settings of said first setting means.

WILLY NAUMANN.